F. W. GURNEY.
ROLLER BEARING.
APPLICATION FILED JULY 2, 1919.
1,325,635.
Patented Dec. 23, 1919.
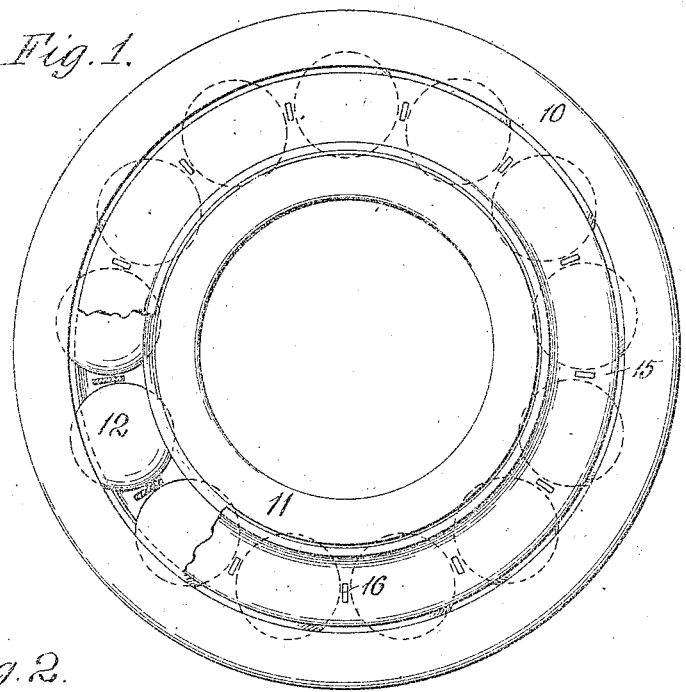
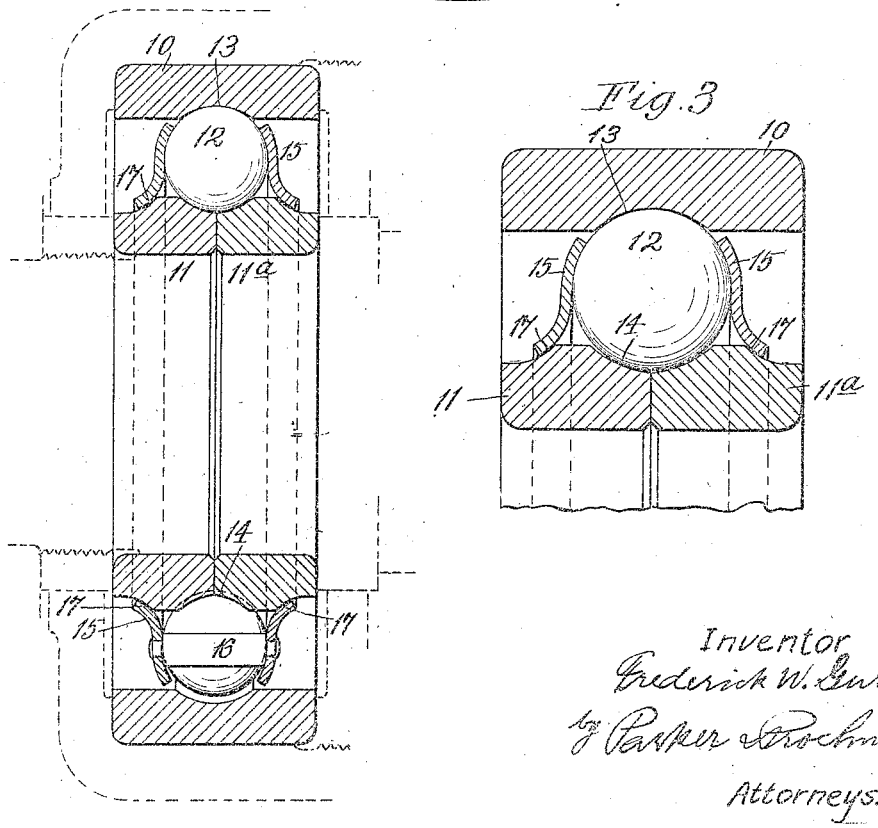
Inventor
Frederick W. Gurney,
by Parker Strochnow,
Attorneys.

UNITED STATES PATENT OFFICE.

FREDERICK W. GURNEY, OF JAMESTOWN, NEW YORK, ASSIGNOR TO GURNEY BALL BEARING COMPANY, OF JAMESTOWN, NEW YORK.

ROLLER-BEARING.

1,325,635.  Specification of Letters Patent.  Patented Dec. 23, 1919.

Application filed July 2, 1919.  Serial No. 308,161.

*To all whom it may concern:*

Be it known that I, FREDERICK W. GURNEY, a citizen of the United States, residing at Jamestown, in the county of Chautauqua and State of New York, have invented a new and useful Improvement in Roller-Bearings, of which the following is a specification.

This invention relates to ball or roller bearings of the unitary type in which the balls or rolling elements are arranged to roll in races or grooves formed in inner and outer race rings or members. These bearings usually include also a separator or spacer for holding the balls or rolling elements spaced apart, or at regular intervals in the races.

One object of the invention is to produce a bearing which can be assembled with a full set of balls arranged in close relationship in deep race grooves so that the bearing is suitable for taking not only radial loads but also very heavy thrust loads in both directions. Other objects of the invention are to produce a bearing in which one of the race rings or members, preferably the inner member, is composed of sections or halves which are retained in the intended relation by the separator for the balls or rolling elements, so as to prevent the displacement of the parts of the bearing when handling or shipping the same, before the bearing is placed in its mounting; and also to provide a bearing which is of improved construction in the other respects hereinafter described and set forth in the claims.

In the accompanying drawings:

Figure 1 is an end elevation of a ball bearing embodying the invention, a portion of one of the separator plates being broken away to disclose the balls and the cross members of the separator.

Fig. 2 is a sectional elevation of the bearing, indicating by broken lines the bearing in position in its mounting.

Fig. 3 is an enlarged fragmentary sectional elevation of the bearing.

The bearing shown in the drawings comprises an outer race-ring or member, a divided or sectional inner race-ring or member composed of two sections or halves, a circular series of balls arranged between the inner and outer race-members in grooves or races in said members, and a ball separator by which the balls are spaced at regular intervals around the bearing and which holds together the halves or sections of the divided race-member.

10 represents the outer race-ring or member; 11, 11ᵃ the sections or halves of the divided inner race-ring or member and 12 the balls arranged between the inner and outer race-members. The balls are confined and roll in a ball race or groove 13 in the inner periphery of the outer race member and in a race or groove 14 formed partly in each of the two sections or halves of the inner race member. The two halves or sections of the inner race-member preferably meet or contact with each other in or substantially in the plane of the centers of the series of balls, and the race contour or curvature of each section of the inner member is ground with a radius slightly longer than the radius of a ball, so that when the parts are assembled into the working position the center of the arc of the right hand race-part is a little to the left of the ball center and the center of the arc of the left hand race-part is a little to the right of the ball center, see Fig. 3. The effect of this is that the balls do not roll on or contact with the meeting edges of the two race-sections or in the joint where they come together. There is accordingly no danger of the inner ring sections breaking down at the joint.

The ball separator shown comprises separate side plates or members 15 arranged at opposite sides of the series of balls, and cross-pieces or portions 16 which connect the two side plates and pass between the balls forming separate pockets or spaces in which the balls are confined and held in spaced relationship in the bearing. As shown, the cross-pieces 16 of the separator are formed by separate bars or plates provided with reduced ends which are riveted in holes in the side plates of the separator. The inner edges or portions of the side plates of the separator overlap or extend inwardly at the outer sides of outwardly facing shoulders or portions 17 on the two sections or halves of the inner race-member so that the two sections of this member are retained in place in the bearing by the separator. The bearing is assembled into a unitary structure when the parts of the separator are assembled and riveted together. The holding of the bearing in the unitary structure by the separator is only necessary for the purpose of preventing the bearing from coming apart while it is being handled or shipped. When the bearing is mounted and in use the two halves or sections of the inner ring or member are held firmly together in the mounting between suitable shoulders or parts on the shaft or spindle on which the bearing is seated. When the bearing is in operation the overhanging sides of the separator will run with a clearance between them and the coöperating shoulders on the inner race-ring or separator, riding upon balls rather than upon the race-rings or members.

By dividing one of the race-members, as explained, the balls can be arranged close together, or nearly in contact in deep races or grooves without interrupting the circumferential continuity of the races or race-members or providing holes or spaces for the introduction of the balls. The bearing is therefore suitable for taking heavy thrust loads in both directions. Nevertheless the bearing can be assembled and handled as a unitary structure before it is placed in its mounting.

I claim as my invention:

1. A bearing comprising inner and outer race-members, interposed rolling elements arranged to roll in races in said race-members, one of said race-members being composed of separate sections, and a separator for said rolling elements having portions which coöperate with portions of said sectional race-member to hold the sections in place.

2. A bearing comprising inner and outer race-members, interposed rolling elements arranged to roll in races in said race-members, one of said race-members being composed of separate sections, each forming a portion of one of said races, and a separator for said rolling elements having portions which overlap portions of said sectional race-member to hold the sections in place.

3. A bearing comprising inner and outer race-members, interposed balls arranged to roll in ball races in said race-members, one of said race members and its ball race being divided substantially in the plane of the center of said balls into separate sections, and a separator for said balls having portions which overlap portions of said sectional race-member to hold the sections in place.

4. A bearing comprising inner and outer race-members, interposed balls arranged to roll in ball races in said race-members, said inner race-member and its ball race being divided substantially in the plane of the centers of said balls into separate sections, and a separator for said balls having portions which overlap portions of said sectional race-member to hold the sections in place.

5. A bearing comprising inner and outer race-members, interposed balls arranged to roll in ball races in said race-members, one of said race-members and its ball race being divided substantially in the plane of the centers of said balls into separate sections, said balls contacting with said divided race at a distance from the joint between the race sections, and a separator for said balls having portions which overlap portions of said sectional race-member to hold the sections in place.

6. A bearing comprising inner and outer race-members, interposed rolling elements arranged to roll in races in said race-members, one of said race-members being composed of separate sections each forming a portion of one of said races, and a separator for said rolling elements having separate side plates which are connected by cross-pieces extending between the rolling elements and overlap portions of said sectional race-member to hold the sections in place.

Witness my hand this 18th day of June, 1919.

FREDERICK W. GURNEY.

Witnesses:
JOHN H. BARRINGER,
A. P. RICHARDSON.